(12) United States Patent
Pourias

(10) Patent No.: US 7,584,978 B2
(45) Date of Patent: Sep. 8, 2009

(54) FOLDABLE BICYCLE AND METHOD OF FOLDING

(75) Inventor: Christian Pourias, Vauhallan (FR)

(73) Assignee: Dominique Bied (FR)

( * ) Notice: Subject to any disclaimer, the term of this patent is extended or adjusted under 35 U.S.C. 154(b) by 136 days.

(21) Appl. No.: 10/576,040

(22) PCT Filed: Oct. 15, 2004

(86) PCT No.: PCT/FR2004/050503

§ 371 (c)(1),
(2), (4) Date: Feb. 14, 2007

(87) PCT Pub. No.: WO2005/035347

PCT Pub. Date: Apr. 21, 2005

(65) Prior Publication Data

US 2007/0273126 A1    Nov. 29, 2007

(30) Foreign Application Priority Data

Oct. 15, 2003    (FR)    .................................... 03 50687

(51) Int. Cl.
*B62K 3/00*    (2006.01)
(52) U.S. Cl. ..................... 280/287; 280/87.05; 280/278
(58) Field of Classification Search ................ 280/287, 280/281.1, 87.05, 278
See application file for complete search history.

(56) References Cited

U.S. PATENT DOCUMENTS

| 3,990,717 | A | | 11/1976 | Best | |
| 4,462,606 | A | * | 7/1984 | Hon | 280/278 |
| 4,491,337 | A | * | 1/1985 | Zuck | 280/278 |
| 4,598,923 | A | * | 7/1986 | Csizmadia | 280/287 |
| 5,836,602 | A | * | 11/1998 | Wang | 280/287 |
| 6,032,971 | A | * | 3/2000 | Herder | 280/278 |
| 6,425,598 | B2 | * | 7/2002 | Murayama | 280/278 |
| 6,607,207 | B2 | * | 8/2003 | Shapiro et al. | 280/287 |
| 7,159,884 | B2 | * | 1/2007 | Gu | 280/278 |
| 2006/0097476 | A1 | * | 5/2006 | Kobayashi | 280/287 |
| 2007/0018422 | A1 | * | 1/2007 | Pan | 280/287 |
| 2007/0205577 | A1 | * | 9/2007 | Lau | 280/287 |
| 2007/0210556 | A1 | * | 9/2007 | Hon et al. | 280/287 |

FOREIGN PATENT DOCUMENTS

| DE | 202044 | 9/1908 |
| EP | 0197163 | 10/1986 |
| JP | 2002 145157 | 9/2002 |
| WO | WO 96/01204 | 1/1996 |
| WO | WO 03/029072 | 4/2003 |

* cited by examiner

*Primary Examiner*—Lesley D. Morris
*Assistant Examiner*—Tashiana Adams
(74) *Attorney, Agent, or Firm*—Boyle Fredrickson, SC.

(57) ABSTRACT

The invention relates to a foldable bicycle (1) comprising a first channel (10) for supporting handlebars (7) when folding the bicycle. The invention also relates to a method of folding such a bicycle. This folding method involves at least five horizontal folding axes (17, 18, 19, 20, 21) allowing a compact folded bicycle to be obtained in which all the components forming the bicycle are folded within each other.

23 Claims, 3 Drawing Sheets

FOLDABLE BICYCLE AND METHOD OF FOLDING

Figure 1:
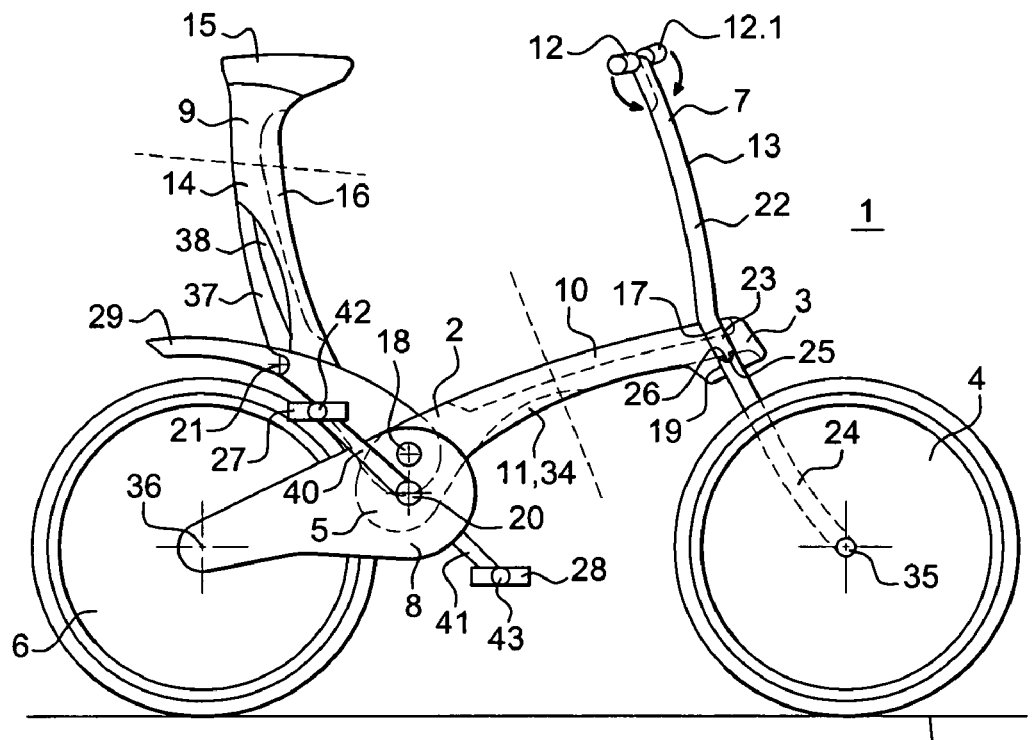

The invention relates to a foldable bicycle and a method of folding such a bicycle. The object of the invention is to obtain a bicycle that is ergonomically foldable and unfoldable. Another object of the invention is to reduce the bulkiness resulting from such a folded bicycle, and to obtain a folded bicycle in the most streamlined form possible without doing violence to the mechanical pieces. The invention relates to the field of transportation but may be applied to other fields. The invention may also be useful during transport of the bicycle on public transportation such as, for example, trains or buses.

A bicycle comprises a front wheel and a rear wheel connected to a frame. Handlebars are connected to the frame to direct the front wheel of the bicycle and the crank gear wheel allows movement in rotation of the rear wheel to move the bicycle along a trajectory. The frame is connected to a saddle allowing a user to be seated on the bicycle.

From document FR 2827829 is known a bicycle that comprises a tube frame forming two parallel tubes. This bicycle also comprises handlebars that are formed by a first arm and a second arm. At the extremity of each of these arms extends a handle perpendicular to the corresponding arm in the direction opposed from the tube frame. When folding the bicycle, the front wheel is inserted between the two tubes. The insertion of the front wheel between the two tubes presents the advantage of not further increasing the thickness of the bicycle. However, folding the handlebars may lead to bulkiness of this folded bicycle due to the presence of handles that may rub against the legs of the user and slow this user down during these movements.

From document EP-B1-0 263 554 is known a foldable bicycle comprising a frame. This frame comprises a housing designed to receive part of the front wheel. This bicycle also comprises handlebars with a first branch and a second branch. At the extremity of each of these branches also extends a handle that is relatively perpendicular to each of the branches. Folding of the bicycle is done by positioning the front wheel in the housing formed by the frame and by the handlebars folding down in the direction of the frame. Insertion of the front wheel in the housing also presents the advantage of not further increasing the thickness of the bicycle. However, folding of the handlebars may also lead to bulkiness of the folded bicycle because of the presence of handles.

To resolve this problem, the invention provides making a foldable bicycle comprising a hollowed out frame with a first channel in a form complementary to that of the handlebars. Handlebars are provided comprising a guide rod and handles connected to this rod. These handles are connected in such a way as to be folded along the guide rod. Therefore the handlebars are housed in the first channel with its folded down handles. The first channel may be made while providing sufficient space for supporting more than such handles.

The invention also provides a saddle comprising a second channel to overlap the handlebars during folding of the bicycle. Therefore, the handlebars are overlapped first by the frame and secondly by the saddle. The frame as well as the saddle form a protective case for the handlebars.

The invention lastly provides at least one third channel in a form complementary to a form of part of at least one of the two wheels. The rear wheel is housed in a channel formed by the frame after rotation of this same rear wheel around a horizontal axis. The front wheel is housed in another channel or rather in the same channel as that supporting the rear wheel after rotation around another horizontal axis. The two wheels are disposed after their rotation in such a way that the front wheel overlaps the rear wheel parallel to a plane formed by the bicycle. To do this, the invention provides means to achieve horizontal translation or perpendicular translation of the front wheel with relation to the frame and with relation to the plane formed by the bicycle in such a way as to allow the front wheel to be placed opposite the rear wheel parallel to the plane formed by the bicycle in such a way as to allow the rear wheel to come to be housed in the channel.

The invention advantageously allows a bicycle to be obtained that is folded in such a way that the different components forming the bicycle are folded within each other. Components forming the bicycle are understood to refer to the frame, the front wheel, the rear wheel, the saddle, the handlebars and the crank gear wheel.

Such a bicycle according to the invention advantageously allows bulkiness resulting from folding the bicycle to be reduced.

The invention also presents the advantage of being able to dispose several bicycles folded according to the invention while optimizing the space defined by a standard car, bus, train or baggage room compartment.

Therefore, the object of the invention is a foldable bicycle comprising a front wheel, a rear wheel, handlebars to direct the front wheel, a frame, a saddle and a mechanism so that a plane of the front wheel is parallel to a plane of the rear wheel and so that the front wheel is situated opposite from the rear wheel with their axes merging at the time of folding, characterized in that the bicycle comprises a mechanism for translation of the front wheel perpendicular to the plane of the bicycle.

Another object of the invention is a method for folding a bicycle, characterized in that the method comprises the following steps:

the handlebars are folded in a first channel formed in the frame, by rotation of the handlebars around a first folding axis, the saddle is folded against the frame to overlap the handlebars by the second channel formed by the saddle, by rotation of the saddle around a second folding axis, the front wheel is moved by translation perpendicular to a plane formed by the bicycle, then the front wheel is folded in the direction of the rear wheel by rotation of the front wheel around a third folding axis, and the rear wheel is folded in the direction of the front wheel by rotation of the rear wheel around a fourth folding axis.

Figure 2:
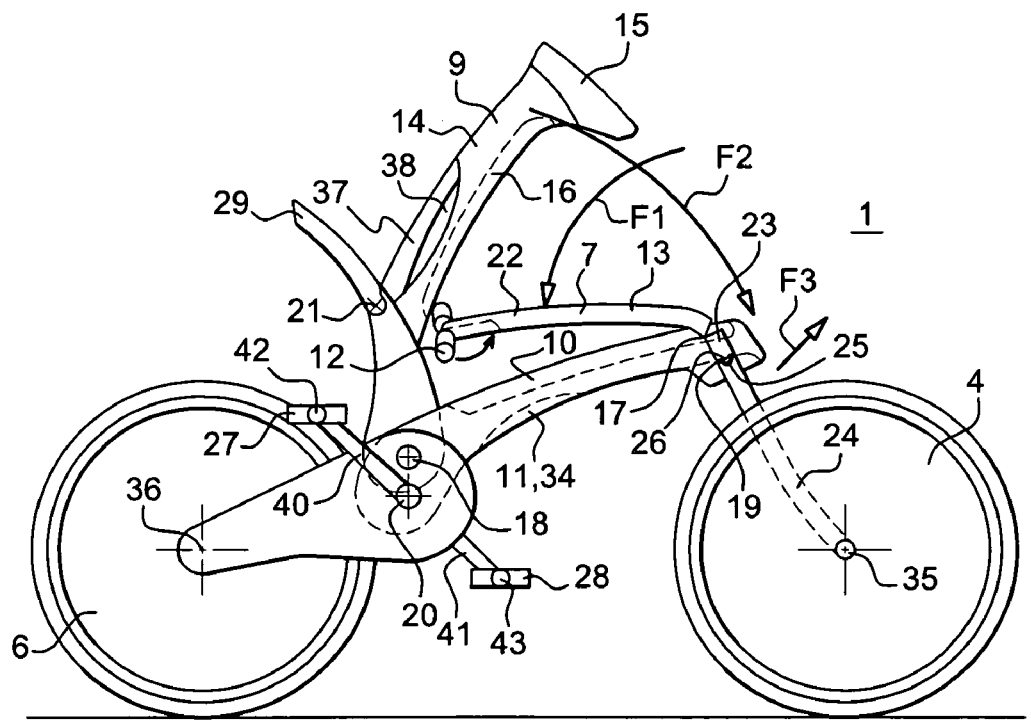
Figure 3:
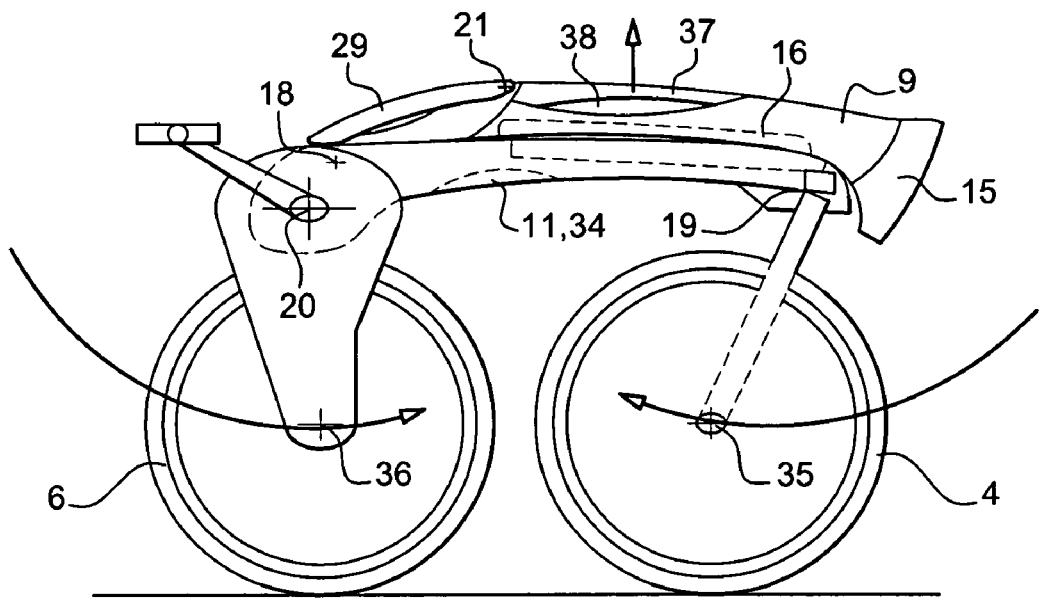
Figure 4:
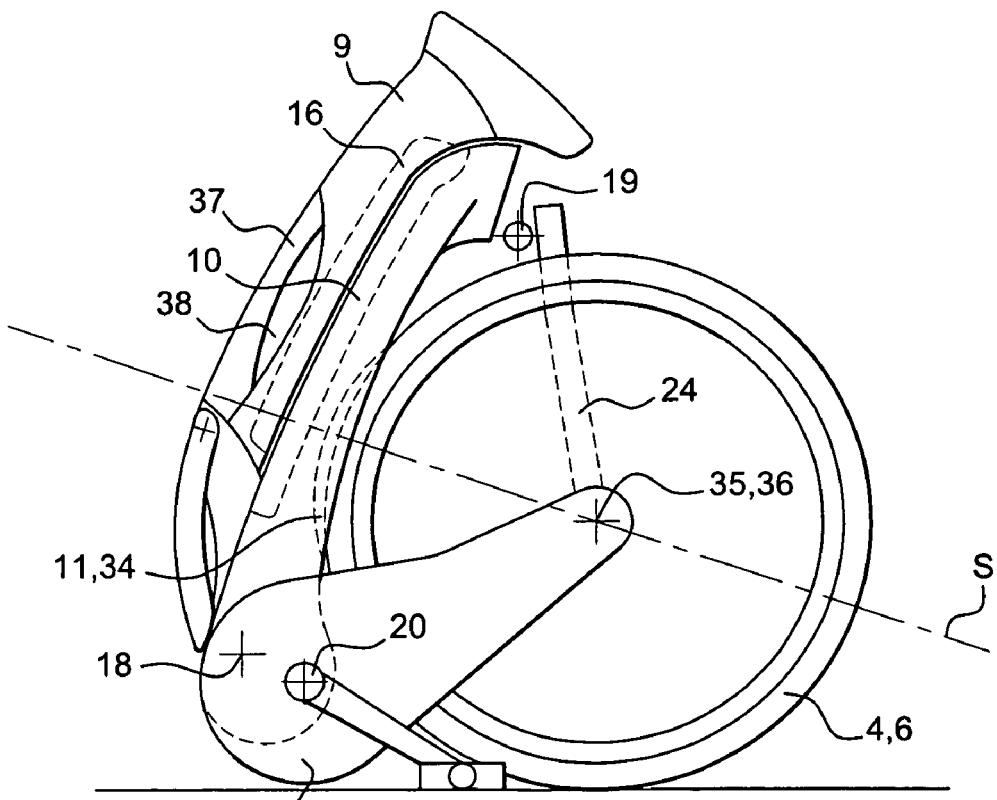
Figure 5:
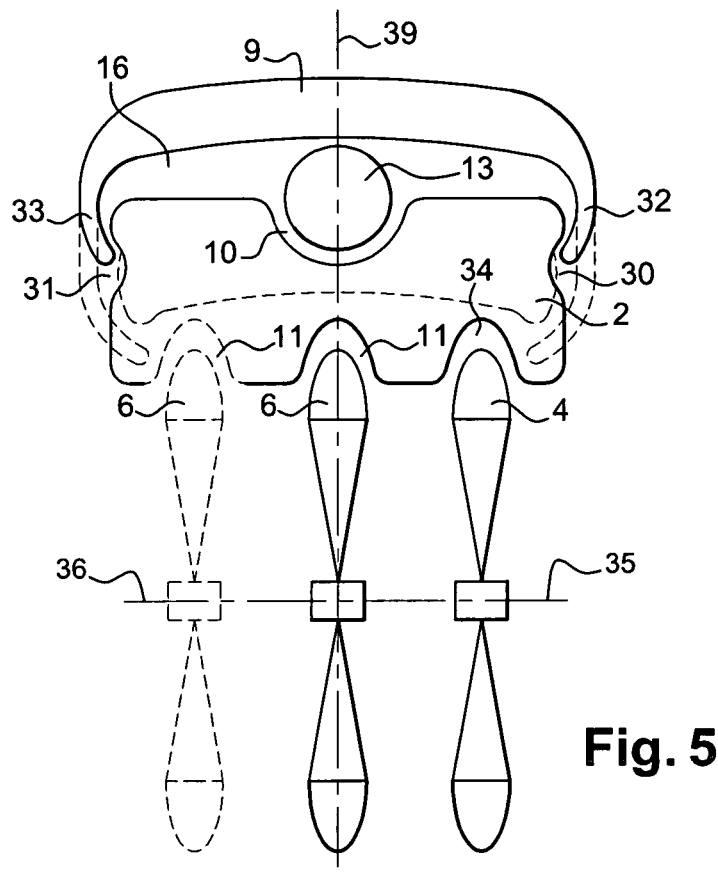
Figure 6:
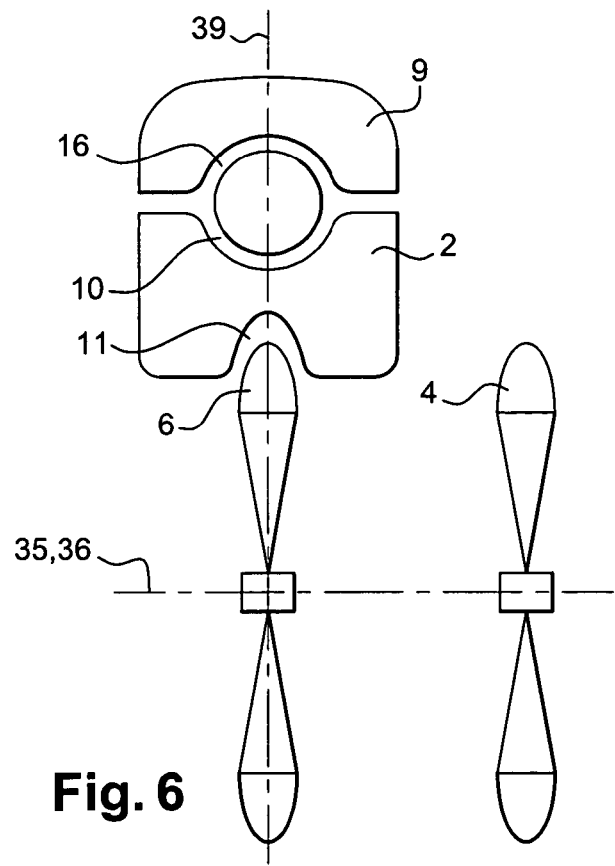

The invention will be better understood upon reading the following description and examining the accompanying figures. The figures are given by way of indication and in no way limit the invention. The figures show:

FIG. 1: a foldable bicycle according to the invention;

FIG. 2: a foldable bicycle according to a first folding step;

FIG. 3: a foldable bicycle according to a second folding step;

FIG. 4: a foldable bicycle according to a third folding step;

FIG. 5: a cross section of a bicycle folded according to a variation of the invention, and FIG. 6: a cross section of a bicycle folded according to the invention.

FIG. 1 represents a foldable bicycle 1, according to the invention. More particularly, this bicycle 1 comprises a frame 2 leading at one front extremity 3 to a front wheel 4 and at one rear extremity 5 to a rear wheel 6. The front wheel 4 and the rear wheel 6 turn around a front axis of rotation 35 and around a rear axis of rotation 36 respectively. The front wheel 4 and the rear wheel 6 may be 18-inch or 20-inch wheels. The front wheel 4 is connected to articulated handlebars 7 through a monofork 24. The rear wheel 6 is connected to a crank gear wheel 8.

The rear wheel 6 may be connected to the crank gear wheel 8 through a belt drive, chain drive or universal-joint drive.

This drive may be streamlined in such a way as to protect the bicycle and make folding the bicycle clean without the user risking dirtying his hands or harming the drive while folding. The rear extremity 5 of the frame also comprises a saddle 9 allowing a bicycle user to be seated while pedaling on the crank gear wheel and while directing the bicycle by using the handlebars along a trajectory T.

According to the invention, the frame 2 comprises a first channel 10. This first channel 10 is represented in dotted lines in FIG. 1. The first channel 10 comprises an elongated form complementary to a form of the handlebars 7. The handlebars 7 are designed to be housed in this first channel 10 when folding the bicycle.

The handlebars 7 comprise a first handle 12, a second handle 12.1 and a guide rod 13. The first handle and the second handle extend from both sides of the guide rod. The guide rod connects the handles to the front wheel 4. To reduce the bulkiness of the bicycle once it has been folded, the first handle and the second handle may be connected to the guide rod 13 to be folded along the guide rod. Therefore, the first channel 10 may therefore comprise a form allowing such handles folded along the guide rod to be supported.

The saddle 9 comprises a seat post 14 and a seat 15. Also according to the invention, the saddle 9 hollowed out with at least a second channel 16 in an elongated form complementary to a form of the guide rod 13. This second channel 16 is represented in dotted lines in FIG. 1. The saddle may also be hollow in such a way that the saddle comprises a form complementary to a form of the front extremity of the bicycle. This second channel extends from the seat 15 along the seat post 14. The second channel may partially overlap the front extremity 3 of the frame. This second and/or first channel may also have a form that is at least partially complementary to the handles of the handlebars in the folded position.

The frame 2 also comprises at least one third channel 11, 34 in a form complementary to that of at least part of one of the wheels 4 or 6. FIG. 6 represents a cross section passing by axis S of a bicycle folded according to the invention represented in FIG. 4. This third channel 11 may comprise a form that is preferentially circular to be adapted to the form of a wheel. Or this third channel 11 may be rectangular shaped. According to the invention, the frame comprises a third channel 11 designed to support at least one of the two wheels 4 or 6 according to axis 39 passing along the plane formed by the bicycle. Preferentially, the front wheel shifts with relation to the rear wheel in FIG. 6. In this preferred example, the frame allows one of the two wheels to be supported.

FIG. 5 represents a cross section passing by axis S on a bicycle folded according to a variation of the invention represented in FIG. 4. According to this variation, the frame may support the two wheels. In fact, the frame comprises a first third channel 11 and a second third channel 34 respectively designed to support the rear wheel 6 and the front wheel 4 when folding the bicycle. Or rather, the frame comprises a single third channel in a form allowing the two wheels to be supported as represented in dotted lines in FIG. 5. In these last two cases, it may be necessary to shift at least one of the two wheels with relation to the other. In the example of FIG. 5, the front wheel 4 is shifted parallel with relation to the axis 39 of the bicycle. But in this same example of FIG. 5 is represented a shifting of the front wheel 4 and the rear wheel 6 parallel to axis 39. Each of the wheels is shifted in directions opposite from each other and with relation to axis 39. The shifted rear wheel 6 is represented in dotted lines in this same FIG. 5.

Making a frame with a first channel 10 and at least one third channel 11, 34 advantageously allows the weight of the bicycle to be reduced.

The bicycle defines a first side and a second side on both sides of a plane formed by the bicycle. To reduce the bulkiness of the folded bicycle, the monofork 24 is preferably situated by the first side of the plane formed by the bicycle and the crank gear wheel 8 is placed by the second side of this same plane.

To fold the bicycle according to the invention, the bicycle comprises at least five horizontal folding axes 17, 18, 19, 20, 21. A first folding 17 is situated on the guide rod 13 of the handlebars 7. This folding axis 17 allows the handlebars 7 to be folded against the frame 2 while pivoting around this first horizontal axis 17. On both sides of this first axis 17 is delimited a first portion 22 of the guide rod 13 and a second portion 23 of the guide rod from handles 12, 12.1 in the direction of the front wheel 4. More particularly, this first portion 22 of the guide rod 13 is folded in the first channel 10. The second portion is smaller than the first portion 22 and is connected to the monofork 24.

A second folding axis 18 is situated on the seat post 14 and is designed to allow the saddle 9 to be folded against the frame 2 while partially overlapping the handlebars 7. The saddle 9 partially overlaps the handlebars through the second channel whose form is complementary to the form of the guide rod. This second axis 18 is situated between the seat post 14 and the frame 2. Advantageously, the saddle 9 folds against the frame while partially overlapping the front extremity of the frame.

A third folding axis 19 is situated on the guide rod 13. This third axis 19 allows the front wheel 4 to be folded in the direction of the rear wheel 6 while allowing this same front wheel 4 to be situated facing the rear wheel once it is folded parallel with relation to the plane formed by the bicycle. To do this, the frame 2 may be made in such a way that it is possible to displace the monofork 24 and the front wheel 4 by horizontal translation in the direction of the first side of the plane formed by the bicycle opposite to the second side of this same plane of the where the crank gear wheel is situated. This horizontal translation is represented by arrow F3 in FIG. 2. The object of this horizontal translation is to parallel shift the monofork 24 of the second portion 23 of the guide rod. To do this, the second portion 23 and the monofork 24 may respectively comprise at a first location a longitudinal protuberance 26 in a round form and at a second location a groove 25 also in a round form. The groove and protuberance are designed to cooperate with each other to fit into each other. In a preferred example, the guide rod 13 and monofork 24 form a circular cross section. Therefore, the groove 25 and the protuberance 26 are constructed on at least one portion of a diameter defined by these circular sections. The protuberance extends in the frame 2 in such a way as to allow the monofork 24 and therefore the front wheel 4 to pivot around this third folding axis 19 after translation.

A fourth folding axis 20 is situated at the location where pedals 27, 28 from the crank gear wheel 8 are connected and which extend on both sides of this crank gear wheel 8. Or rather this fourth folding axis 20 is situated near the location where the pedals 27, 28 are connected to the crank gear wheel 8. This fourth axis 20 allows the rear wheel 6 to fold against the frame 2 while pivoting around this fourth axis 20. After rotation around this fourth axis 20, the rear wheel 6 folds in the third channel 11 provided for this purpose.

A fifth folding axis 21 is situated at a location on the seat post 14 between the seat 15 and the second axis 18. The fifth axis 21 allows mud guard 29 to also be folded against the rear wheel 6 once the bicycle is folded. Folding of this mud guard 29 allows the rear wheel 6 to be partially protected once the bicycle is folded. This mud guard also allows this rear wheel to be protected from possible shocks or friction produced during transport of the folded bicycle by a user.

Handling of this mud guard may also be a means for locking/unlocking the foldable bicycle. For example, when this mud guard is folded in the direction of the rear wheel by rotation around this fifth axis, one may lock the unfolding of the saddle and handlebars that remain locked in the folded position. This specific locking of the saddle and handlebars may be useful during folding of the bicycle as will be explained later in the description.

Each articulation comprises locking means (not represented). For example, the articulation around the first axis 17 may be locked by means of hooks (not represented) preventing the guide rod from pivoting from the rear wheel 6 in the direction of the front wheel 4 or conversely during use of the bicycle. These hooks may be made in such a way as to connect fixedly the first portion 22 to the second portion 23.

In another example, the articulation around the second axis 18 may be locked a ratchet and pawl mechanism of the second channel of the saddle on the frame, as represented in FIG. 5. The ratchet and pawl mechanism of the second channel on the frame also locks the articulation around the first axis 17. The ratchet and pawl mechanism of the second channel on the frame will also be explained later in the description.

Or rather these two articulations around axes 17 and 18 may be locked by means of a rod crossing horizontally or vertically the saddle and handlebars at a location close to the seat of the bicycle.

These locking means may be hooks, clips, pins, rods, etc.

These locking means may be independent means from one articulation to another. Or rather, one may expect that these are central locking means such that they control the locking or unlocking performed in a single step or in several steps.

The first pedal 27 and the second pedal 28 are connected to the crank gear wheel by a first arm 40 and by a second arm 41 respectively. The first arm and second arm are connected to the crank gear wheel around the axis 20. The first and second pedals are connected to the corresponding arms around an axis 42 and around an axis 43 respectively. To reduce the bulkiness of such a foldable bicycle according to the invention, one may fold the arms of the crank gear wheel along the plane formed by the bicycle. Each of these arms may be inserted by fitting on a protuberance (not represented) extending relatively perpendicularly to the crank gear wheel. This protuberance comprises a first notch and a second notch. The arm is spaced apart from the crank gear wheel to disengage from first notch. Then the arm is pivoted in the direction of the monofork. The arm is folded against the crank gear wheel by engaging the arm in the second notch of the protuberance. The arm is then locked in the desired position. For example, the arms may be folded in such a way as to be placed facing each other. Lastly, the pedals are each folded at the same time against the plane of the bicycle to reduce the thickness of the bicycle.

One may also expect that one of the pedals may be folded against the plane of displacement of the bicycle and be used as a kickstand when the bicycle is folded.

One of the two arms of the crank gear may pivot around the crank gear axis 20 by 180° to bring the first arm face to face with the second, allowing these arms to enter in a minimum surface of the folded bicycle. One advantageously prevents component overlapping.

The saddle may be hollowed out with an opening 38 allowing a transport handle 37 to be formed. This handle 37 may also be used to pull the folded bicycle as one would pull a rolling suitcase. The front and rear wheels may turn on themselves to facilitate displacement of such a folded bicycle. Or rather, another handle (not represented) may be placed at a location near the front or rear extremity of the frame.

The saddle and frame may be made in moldable materials in such a way as to be able to integrate mechanical functions of each of the pieces forming the bicycle, articulations, means to lighten the bicycle, etc. Articulation is understood to refer to a location where a first piece is joined to a second piece by an axis.

The bicycle preferentially comprises a non-adjustable dimension. For example, three standard sizes of foldable bicycles according to the invention may exist in such a way as to limit the number of articulations on the bicycle.

The method of folding the bicycle is performed in the following manner. In a first step, the first portion 22 of the guide rod is folded against the frame 2 while pivoting around the first horizontal axis 17. The pivoting around this first axis 17 is represented by arrow F1 in FIG. 2. The handlebars 7 may be folded in such a way that the guide rod 13 and handles 12 and 12.1 fit in the first channel 10 provided for this purpose. Prior to this folding, handles 12 and 12.1 are folded along the guide rod.

Then, the seat post 9 is folded by rotation around the second axis 18 in the direction of the frame 2 in such a way as to cover the guide rod 13 of the handlebars and possibly the folded handles. Folding of the seat post is represented by arrow F2 in FIG. 2. According to a cross section passing by axis S of the folded bicycle at a location where the handlebars 7, saddle 9 and frame 2 are placed in FIG. 5, is observed that the guide rod 13 is placed between the first channel 10 and the second channel 16. One observes that the guide rod 13 is overlapped first by the frame 2 and secondly by the seat post 14. The frame 2 and the seat post 14 form a protective case for the guide rod 13. Furthermore, the seat 15 is folded while overlapping the front extremity 5 of the frame, providing an overall rounded form to the folded bicycle.

In a variation of the invention, the saddle 9 forms a locking means as previously mentioned. In fact, saddle 9 may be made in a U shape to fit on the frame 2 while protecting the handlebars 7, FIG. 5. This saddle 9 may be elastically caught against a wall formed by the frame 2. To do this, the frame 2 may comprise a first reinforcement 30 and a second reinforcement 31 diametrically opposed in such a way as to respectively support a first lateral edge 32 and a second lateral edge 33 that are formed by the saddle 9. This first edge and second edge are represented in dotted lines in FIG. 5 and are formed by extending the extremities of the saddle. This first edge and second edge are respectively latched on the first reinforcement and on the second reinforcement of the frame 2, FIG. 5. The U shape of the saddle also allows the weight of the bicycle to be advantageously reduced.

Then, one or the other of the two wheels are folded, FIG. 3. In a preferred example, a horizontal translation of the front wheel 4 is first performed with relation to the frame in such a way as to parallel shift the monofork 24 of the first portion 22 of the guide rod, FIG. 3. Then the front wheel pivots around the third axis 19 in such a way as to fold the front wheel 4 in the direction of the frame 2. This horizontal translation also has the object of shifting the front wheel 4 from the rear wheel 6 parallel with relation to the plane formed by the bicycle.

Then the rear wheel 6 pivots in the direction of the frame 2 to partially insert this rear wheel 6 in the first third channel 11. The rear wheel 6 is then placed facing the front wheel 4 parallel with relation to the plane formed by the bicycle. In this manner, the front wheel 4 and the rear wheel 6 are disposed facing the other with their front 35 and rear 36 axes of rotation merging, FIG. 5. The front wheel may be placed in the same channel as the rear wheel, as represented by dotted lines in FIG. 5. Or rather, the rear wheel may be placed in the second third channel 34.

In a preferred embodiment of the invention, the bicycle is raised vertically with relation to a plane of displacement of the front bicycle to fold the front wheel and the rear wheel. Folding the front wheel 4 and the rear wheel 6 may be performed by raising the bicycle vertically with relation to the plane of displacement preferentially after having shifted the front wheel 4 with relation to the rear wheel 6.

To facilitate folding of the bicycle and because of the presence of the crank gear wheel connected to the rear wheel, the front wheel is preferentially shifted with relation to the rear wheel. But folding the bicycle may also be done by shifting the rear wheel with relation to the front wheel.

To facilitate folding the bicycle and as previously mentioned, one may also lock the saddle and handlebars in the folded position, by folding the mud guard around the axis 21. In the folded position, the mud guard locks articulation 17 and articulation 18. Folding the bicycle is facilitated since it is not necessary while raising the bicycle to hold the folded handlebars and saddle by the hands. With the invention, the user may raise the bicycle with his first hand, then possibly fold the front and rear wheels using his second hand. To facilitate folding the bicycle, folding the bicycle by using springs (not represented) placed between each of the wheels and the frame may be provided. These springs would facilitate the rotation of the front wheel and the rear wheel around axes 19 and 20 respectively when raising the bicycle. The user would no longer have to use his second hand to help fold the wheels.

Such folding according to the invention allows a compact folded bicycle with an overall rounded and non-violent form to be obtained.

To cause the bicycle to be held in a vertical position with relation to the plane of displacement of the bicycle, the fairing protecting the drive situated on one side of the plane formed by the bicycle may also be counterbalanced by another fairing (not represented) situated on the other side of the plane formed by the bicycle.

The bicycle according to the invention also presents other advantages. Particularly, such a bicycle does not pinch the fingers. This bicycle may be folded practically from a standing position of a user. Folding the bicycle may be performed cleanly without risk of the user getting dirty.

Such a bicycle according to the invention presents no violence with regard to the user and to the bicycle environment. One may provide a cover that does not damage the bicycle environment because of the pedals for example. To further reduce the possible violence of such a bicycle according to the invention, the wheels may also be streamlined through full wheel discs or rims.

In the invention, making a folded bicycle presenting the smoothest surface possible is sought. Making the most compact possible folded bicycle without occurrence of obstacles tending to be extended perpendicularly to the plane formed by the bicycle is also sought.

Lastly, making a compacted object without aggressiveness is also sought.

The invention claimed is:

1. A foldable bicycle comprising:
a front wheel,
a rear wheel,
handlebars to direct the front wheel,
a frame,
a guide rod in operative communication with the frame connecting the handlebars to the front wheel,
a saddle comprised of a seat,
wherein the frame comprises a mechanism so that a plane of the front wheel is parallel to a plane of the rear wheel and so that the front wheel is situated facing the rear wheel with their axes merged at the time of folding, and
wherein the bicycle comprises a mechanism for translation of the front wheel perpendicular to a plane of the bicycle, and
wherein the guide rod comprises a plurality of folding axes with one of the folding axes enabling the handlebars to be folded about the one of the folding axes and another one of the folding axes enabling the front wheel to be folded about the another of the folding axes.

2. The bicycle according to claim 1, wherein frame comprises a first channel in a form complementary to a form of the handlebars, and articulation means of the handlebars so that the handlebars are housed in the channel at the time of folding.

3. The bicycle according to claim 1, wherein the handlebars comprise a portion of the guide rod, a first handle and a second handle, the first and second handles connected to the guide rod so as to fold along the guide rod at the time of folding the bicycle.

4. The bicycle according to claim 1, wherein the saddle comprises a second channel in a form complementary to the form of the handlebars.

5. The bicycle according to claim 4, wherein the saddle further comprises a seat post, the second channel being formed along the seat and along the seat post.

6. The bicycle according to claim 5, further comprising a mud guard carried by the frame to which the seat post is pivotally connected defining a folding axis about which the seat and seat post are foldable.

7. The bicycle according to claim 1, wherein:
the front wheel of the bicycle is connected to the handlebars by the guide rod, the guide rod comprising a monofork that is situated on a first side of the plane formed by the bicycle,
the rear wheel is connected to a crank gear wheel that is situated on a second side of the plane formed by the bicycle.

8. The bicycle according to claim 1, wherein the frame comprises at least one third channel in a form complementary to a form of part of one of the two wheels.

9. A method of folding a bicycle, wherein the method comprises the following steps:
handlebars carried by a guide rod are folded in a first channel formed in a frame by rotation of the handlebars around a first folding axis of the guide rod,
a saddle is folded against the frame to overlap the handlebars by a second channel formed by the saddle by rotation of the saddle around a second folding axis,
a front wheel carried by the guide rod, the front wheel is displaced by translation perpendicular to a plane formed by the bicycle, wherein the front wheel is folded in the direction of a rear wheel by rotation of the front wheel around a third folding axis of the guide rod such that a portion of the guide rod folds with the front wheel in the direction of the rear wheel, and
the rear wheel is folded in the direction of the front wheel by rotation of the rear wheel around a fourth folding axis.

10. The folding method according to claim 9, wherein the rear wheel is folded in a first third channel formed in the frame, and the front wheel is folded in a second third channel formed in the frame.

11. The folding method according to claim 9, wherein the rear wheel and front wheel are folded in the same third channel formed in the frame.

12. The folding method according to claim 9, wherein the rear wheel and front wheel are folded respectively in a first third channel and in a second third channel formed in the frame.

13. The folding method according to claim 9, wherein the bicycle is raised vertically with relation to a plane of normal displacement of the bicycle before folding the front wheel and the rear wheel.

14. The folding method according to claim 9, wherein the saddle comprises a seat and the seat post, a mud guard carries the seat post with the second folding axis disposed on the mud guard such that the seat post rotates about the second folding axis relative to the mud guard and wherein the mud guard is folded by rotation of the mud guard around a fifth folding axis situated on the frame.

15. A foldable bicycle comprising:
- a frame having at least one recessed channel;
- a handlebar stem supported by the frame and comprising a plurality of handlebar handles;
- a front wheel connector supported by the frame and carrying a front rotatable wheel;
- a rear wheel connector attached to the frame and carrying a rear rotatable wheel;
- a seat post operably attached to the frame and carrying a seat;
- a fender operably attaching the seat post to the frame;
- at least a plurality of pairs of bicycle fold axes with a first fold axis permitting the handlebar stem to be pivotable relative the frame toward the frame, a second fold axis on the fender permitting the seat post to be pivotable relative the frame toward the one of the recessed frame channels, a third fold axis permitting the fender to be pivotable relative the frame, a fourth fold axis permitting one of the front and rear wheel connectors to be pivotable relative the frame toward the at least one of recessed frame channel, and a fifth fold axis permitting the other one of the front and rear wheel connectors to be pivotable relative the frame towards the frame;
- wherein when the bicycle is in a folded position, a portion of one of the front and rear wheels is seated in the at least one of the recessed frame channels and the other one of the front and rear wheels is disposed adjacent the other one of the front and rear wheels such that the axis of rotation of the front and rear wheels is substantially coincident.

16. The bicycle according to claim 15, wherein the at least one recessed frame channel comprises a plurality of recessed frame channels with the portion of one of the front and rear wheels being seated in one of the recessed frame channels when the bicycle is folded and at least a portion of the handlebar stem is seated in the other one of the recessed frame channels when the bicycle is disposed in the folded position.

17. The bicycle according to claim 16, wherein the seat post is elongate and has a longitudinally extending recessed channel formed therein in which an opposite portion of the handlebar stem seats when the bicycle is disposed in the folded position.

18. The bicycle according to claim 16, wherein each one of the handlebar handles is foldable against the handlebar stem.

19. The bicycle according to claim 16, wherein the frame includes a third one of the recessed frame channels in which a portion of the other one of the front and rear wheels seats when the bicycle is disposed in a folded position.

20. The bicycle according to claim 15, wherein the frame and wheels are disposed in a common plane when the bicycle is disposed in an unfolded operating position with the front wheel connector and rear wheel connector disposed alongside to one side of the bicycle operating position plane.

21. The bicycle according to claim 20, wherein the front wheel connector comprises a fork disposed along one side of the bicycle operating position plane and the rear wheel connector comprises a crank gear wheel disposed along the other side of the bicycle operating position plane.

22. The bicycle according to claim 21, wherein the fork comprises a monofork that is connected to the handlebar stem.

23. The bicycle according to claim 6, wherein the mud guard is pivotally attached to the frame defining another folding axis about which the mud guard is foldable.

* * * * *